UNITED STATES PATENT OFFICE.

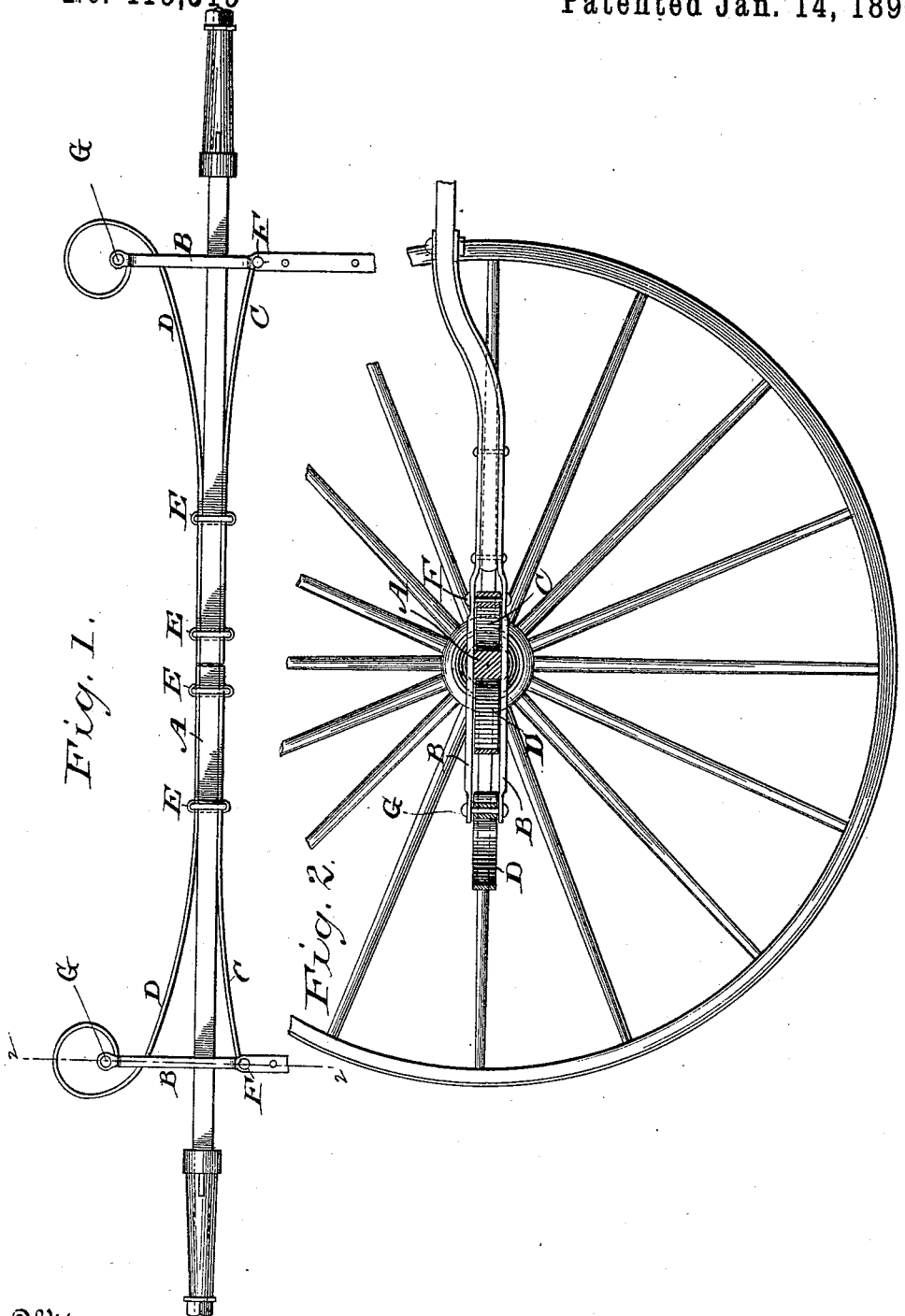

JOHN COSGROVE, OF OXFORD, INDIANA, ASSIGNOR OF ONE-HALF TO J. A. COSGROVE, OF UTICA, ILLINOIS.

THILL-COUPLING.

SPECIFICATION forming part of Letters Patent No. 419,319, dated January 14, 1890.

Application filed November 8, 1889. Serial No. 329,628. (No model.)

*To all whom it may concern:*

Be it known that I, JOHN COSGROVE, of Oxford, county of Benton, and State of Indiana, have invented a certain new and useful Improvement in Thill-Couplings, of which the following is a specification, reference being had to the accompanying drawings.

The object of my invention is to provide a spring-connection for the shafts or tongue of a vehicle to the axle, so as to relieve the axle of strain when the wheels strike an obstacle and to prevent the unpleasant motion in two-wheeled vehicles imparted from the motion of the horse to the rider's seat.

My present invention is an improvement upon the subject-matter of my Patent No. 413,335. In that patent the thills are shown as pivotally connected to the thill-coupling and the springs as directly united to said coupling on each side of the axle.

My improvement consists in making the connection between the thill and the thill-coupling rigid and in providing for the necessary play of the parts by a convolution in the spring behind the axle, instead of the pivotal connection above referred to.

In the accompanying drawings, Figure 1 illustrates a plan view of my improved coupling attached to an axle. Fig. 2 is a section on line 2 2 of the same, with wheel attached.

Referring to the letters upon the drawings, A indicates an ordinary axle provided with clips B, which may be continuations of the rear irons of the thills or united to them in any way so as to afford a rigid connection between the two. These clips fit loosely upon the axle and allow it considerable play within them.

C and D indicate springs secured to the front and rear of the axle by clips E. The outer ends of the spring C are secured to the ends of the thills by bolts F or by any convenient means. The spring D passes through the clips B and is curved around in the manner illustrated in the drawings and united to the rear ends of said clips by bolts G, passing through eye-holes in the ends of the spring, or by any convenient means. The spring C may be provided with curved ends and united to the thills in the same manner as the spring D is united to the clips; but generally I believe for the front spring a direct connection will be sufficient. I do not, however, desire to limit myself to the use of one curved spring.

What I claim is—

In a thill-coupling consisting of clips adapted to be secured to the thills of a vehicle and to the axle of the vehicle by means of front and back springs, the combination, with said clips, of a spring secured to the axle and curved at its ends in the manner described, so as to permit free play of the clips upon the axle and the use of a rigid connection between the thills and the clips, substantially as set forth.

In testimony of all which I have hereunto subscribed my name.

JOHN COSGROVE.

Witnesses:
   AMOS J. ANDERSON,
   JOHN A. KOCH.